No. 688,867. Patented Dec. 17, 1901.
W. S. KOCHER.
NUT LOCK.
(Application filed May 17, 1901.)
(No Model.)
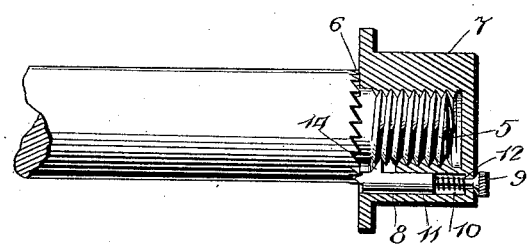
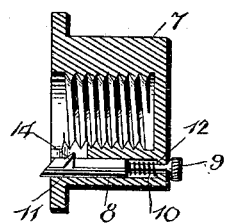
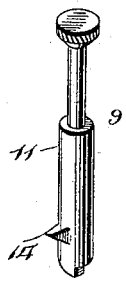
Witnesses
Inventor
William S. Kocher,
by Chandlee & Chandlee
Attorneys

UNITED STATES PATENT OFFICE.

WILLIAM S. KOCHER, OF DANVILLE, PENNSYLVANIA.

NUT-LOCK.

SPECIFICATION forming part of Letters Patent No. 688,867, dated December 17, 1901.

Application filed May 17, 1901. Serial No. 60,697. (No model.)

*To all whom it may concern:*

Be it known that I, WILLIAM S. KOCHER, a citizen of the United States, residing at Danville, in the county of Montour, State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut-locks; and it has for its object to provide a construction that is specially adaptable to axle nuts or burs and which while holding the nut positively against accidental displacement may be easily and quickly removed when desired.

In the drawings forming a portion of the specification, and in which like numerals of reference indicate similar parts in the several views, Figure 1 is a view showing the end of an axle in elevation and showing the nut with the locking-pin, the nut being in section and the pin in its engaging position. Fig. 2 is a sectional view of the nut and showing the pin in elevation and rotated from its engaging position. Fig. 3 is a detailed perspective view of the pin.

Referring now to the drawings, there is shown the end of an axle-spindle having a reduced and threaded extremity 5, having a shoulder 6 at its base and which is provided with a crown-ratchet.

The nut is shown at 7 and longitudinally thereof, and at one side of the threaded socket is a chamber 8, in which is disposed a pin 9, having a surrounding helical spring 10, which bears at its lower end against the foot 11 of the pin and at its upper end against the shoulder 12 of the socket. This spring tends to hold the pin normally inward, so that the end of the pin engages the teeth of the crown-ratchet when the nut is screwed onto the spindle of the axle. It will be noted that the foot of the pin has a laterally-projecting portion 14 and that the pin may be rotated to engage this laterally-projecting portion with a thread of the spindle to hold the pin in engagement with the crown-ratchet.

In applying the nut the pin is rotated to the position shown in Fig. 2 of the drawings, and the nut is then screwed onto the spindle until the end of the pin engages with the ratchet-teeth. When the nut has been screwed up, the pin is rotated to engage the projection of the foot with a thread of the spindle, and the pin is thus held against outward movement from the teeth of the spindle and the nut is held from displacement. When it is desired to remove the nut, it is only necessary to rotate the pin and then draw it outwardly, when the nut may be unscrewed.

What is claimed is—

1. The combination with a spindle having a reduced threaded portion and a ratchet at the base thereof, of a nut for engagement with the spindle, said nut having a pin slidably and rotatably mounted therein and having a lateral projection, whereby the pin may be engaged with the ratchet and with the thread of the spindle to hold the pin from outward movement and to hold the nut against rotation.

2. The combination with a body having a reduced and threaded extremity and a crown-ratchet at the base thereof, of a nut having a chamber therein, and a pin in the chamber and having a lateral projection, said pin being adapted for slidable movement into and out of engagement with the ratchet and for rotatable movement into and out of engagement with the threads of the body.

In testimony whereof I hereunto sign my name, in the presence of two subscribing witnesses, on the 4th day of May, 1901.

WILLIAM S. KOCHER.

Witnesses:
JNO. R. KOCHER,
NATHAN FENSTERMACHER.